US00RE33975E

United States Patent [19]

Asplund et al.

[11] E Patent Number: Re. 33,975

[45] Reissued Date of Patent: Jun. 30, 1992

[54] METHOD OF INSTALLATION OF HARDWARE

[76] Inventors: Timothy K. Asplund, 431 Lark Ave., Maplewood, Minn. 55117; Andrew P. Hektner, 2204 - 4th Ave. N. Apt. No. 4, Menomonie, Wis. 54751

[21] Appl. No.: 625,045

[22] Filed: Dec. 10, 1990

Related U.S. Patent Documents

Reissue of:

[64] Patent No.: 4,835,852
Issued: Jun. 6, 1989
Appl. No.: 203,338
Filed: Jun. 6, 1988

U.S. Applications:

[60] Division of Ser. No. 99,114, Sep. 21, 1987, abandoned, which is a continuation-in-part of Ser. No. 36,493, Apr. 9, 1987, abandoned.

[51] Int. Cl.[5] ..... E04F 11/18

[52] U.S. Cl. ..... 29/464; 29/525.1; 33/645; 52/184; 52/745; 256/65

[58] Field of Search ..... 29/464, 469, 525.1, 29/701, 702; 52/741, 745, 38, 184, 511, 512; 16/DIG. 24, 114 R; 248/251, 223.4, 224.1, 224.2, 222.1, 223.1, 225.1; 256/544, 59, 65, 67; 33/645, 520

[56] References Cited

U.S. PATENT DOCUMENTS

| | | | |
|---|---|---|---|
| 2,610,014 | 9/1952 | Ananson | 248/226 |
| 3,681,881 | 8/1972 | Baran | 52/38 X |
| 3,842,564 | 10/1974 | Brown | 256/59 X |
| 3,982,735 | 9/1976 | Fornells | 256/59 |
| 4,226,394 | 10/1980 | Einhorn | 248/225 |
| 4,505,611 | 3/1985 | Nagashima et al. | 52/511 X |
| 4,558,839 | 12/1985 | Kaplan et al. | 248/542 |

FOREIGN PATENT DOCUMENTS

| | | | |
|---|---|---|---|
| 444005 | 11/1974 | U.S.S.R. | 52/741 |
| 387078 | 2/1933 | United Kingdom . | |

*Primary Examiner*—Joseph M. Gorski
*Attorney, Agent, or Firm*—Kinney & Lange

[57] ABSTRACT

Hardware for mounting a rail to a vertical wall includes two sets of hardware, each set including a wall piece and a rail piece. Each wall piece includes a wall mounting plate screwed to the wall, a threaded shank extending integrally outwardly from the wall mounting plate on a shank axis, a cylindrical disk-like rail piece mounting head integral with the outer end of the shank and inscribed on its face with radially extending scribe lines, and a rail piece clamping nut threadably mounted on the shank between the wall mounting plate and the mounting head. Each rail piece includes a rail mounting plate screwed to the rail and a rail piece mounting head receiving plate offset outwardly from the rail mounting plate. This mounting head receiving plate is provided with a shank receiving slot and is inscribed with a scribe line on the axis of this receiving slot. With the wall mounting plates mounted to the wall, each mounting head receiving plate scribe line and the mounting head scribe lines are used to properly position the rail mounting plate on the rail. To install the rail, the clamping nuts are backed off toward the wall, and the rail pieces are installed into the wall pieces by lowering the rail piece mounting head receiving plates down over the threaded shank and mounting head, and then tightening the clamping nuts up tight against the mounting head receiving plates.

2 Claims, 2 Drawing Sheets

12
22
34
76
36
28
50
53
18
62

71
70
60
72
74
64
66
18
74
68

44
16
18

42
48
46
71
44
40
60
64
12
50
53
36
76
22
53
52
28

METHOD OF INSTALLATION OF HARDWARE

Matter enclosed in heavy brackets [ ] appears in the original patent but forms no part of this reissue specification; matter printed in italics indicates the additions made by reissue.

This is a division of application Ser. No. 07/099,114, filed Sept. 21, 1987; was abandoned which was a continuation-in-part of application Ser. No. 07/036,493, filed Apr. 9, 1987 and now abandoned.

BACKGROUND OF THE INVENTION

1. Field of the Invention.

This invention has relation to the installation of handrailings, also called safety handrailings, and hardware to install such railings on vertical walls, and to methods for installing such railings.

2. Description of the Prior Art

Small railings consisting of rounded wooden dowels of size such that adults can wrap their hands substantially entirely around them are typically constructed to have one flattened side. They are usually installed using brackets which include a vertically positioned plate screwed into the wall, a shank extending outwardly from the plate to position in contact with the flattened bottom side of the railing, and screws extending vertically up through the shank into the bottom flattened portion of the railing. Such railings can be quite effectively held in position with this kind of hardware because the railing is of small diameter and the support bracket is short so that sufficient leverage is not developed under the weight of the average adult using the rail for support to cause the vertical wall plate to be ripped from the wall. Also, no appreciable torque is exerted on the railing itself because it is supported from below.

Such railings will not qualify as "safety railings" for use in public buildings such as shopping centers, governmental buildings, ramps at airline terminals, convention centers and the like. Such safety railings can be fashioned from wooden 2×6's, from plastic or metal of the same approximate size or larger.

In accordance with the prior art such railings have been installed using hardware brackets similar to that described for use with smaller substantially circular railings by fastening the bracket onto the vertical wall, with a shank extending outwardly from this vertical bracket and up to position underneath the 2×6 safety railing, another but horizontal bracket integrally attached to the shank then being screwed into the bottom 2" surface of the safety railing.

This structure has the distinct disadvantage that the leverage of people supporting themselves on the hand grip at the top of the rail causes the rail to "wobble" thus giving an insecure feeling to the user of the rail even if the rail does not actually break loose from its mounting. In order to cure this defect, an extra pipe of dimension to fit from the inside, wall facing vertical side surface of the rail to the wall is used, and then a lag bolt hole is drilled clear through a bottom portion of the safety rail in alignment with the pipe, and a lag bolt is extended through the safety rail, through the pipe, and then is screwed into the wall. This renders the safety rail much more rigid, but at the expense of having to provide the extra pipe, to drill and countersink a lag bolt hole through the safety rail, and to provide a plug to cover the end of the head of the lag bolt.

Another method of installation of safety rails is to use a large diameter wooden dowel with a hole down the middle and to position that dowel between the lower portion of the safety rail and the support wall with a countersunk lag bolt hole extending clear through the safety rail in alignment with the wooden dowel, and with a lag bolt extending through the rail, through the wooden dowel, and being screwed into the vertical support wall. This structure and the method needed to install this structure is also expensive. The method is particularly labor intensive, because of the necessity to coordinate the positioning of the countersunk lag bolt openings through the railing with the precise location of the areas on the wall where the lag bolt can find good support. This usually results in the necessity to drill the lag bolt holes in the railing on the job site.

In some instances, the wooden dowel described above has been replaced with a metal spool in order to give appreciable lateral support of the hardware with respect to the vertical wall face and of the safety rail with respect to the spool. This structure is also expensive and labor intensive to install as was the structure using the wooden dowel.

Another method, a custom method, of installing safety rails is to provide a notch on the vertical surface of the safety rail facing the support wall, to nail, screw, bolt or otherwise fasten a 2×4 directly to the support wall at the desired angle the safety rail is to eventually take, but several inches below the desired top of the safety rail. Once the 2×4 is installed, the safety rail is positioned so that its notch is flat up against the 2×4 and the top of the notch is supported on the 2×4. The safety rail then must be fastened to the 2×4 with lag bolts extending through countersunk lag bolt holes in the safety rail. After the lag bolts are all installed, plugs must be placed in each of the countersunk lag bolt holes. A substantial difficulty with such an installation is that trash falling between the top hand grip portion of the safety rail and the top of the 2×4 cannot easily be cleaned out and removed.

All of the prior art set out above suffers from the difficulty that when the support wall must be repainted or repapered, there is no simple and easy and quick way to remove the safety rail and its hardware for the purpose of refurbishing the wall.

In our Application Ser. No. 07/036,493,the Examiner cited U.S. Pat. No. 4,226,394 granted in October of 1980 to Einhorn, and British Pat. No. 387,078 to Poulden, accepted Feb. 2, 1933. Neither patent nor any possible combination of them anticipates the claims presented herein. The applicants and those in privity with them are aware of no prior art that anticipates these claims.

In our application Ser. No. 07/099,114, the Examiner cited U.S. Pat. No. 4,458,839 granted on Dec. 17, 1985 to Kaplan et al. and U.S. Pat. No. 2,610,014 to Ananson. The Examiner rejected claims 1 through 4 as originally filed in that application on the patent to Kaplan et al in view of the patent to Ananson.

None of the patents cited in our previous applications relate to the novel method of installation of hardware for mounting a hand rail through the particular scribed hardware needed for such installation. None of the patents cited in these applications nor any possible combination of them anticipates the claims presented herein. The applicant and those in privity with them are aware of no prior art any closer than that discussed above and are aware of no prior art which anticipates the claims made herein.

SUMMARY OF THE INVENTION

Hardware for mounting a handrail on a wall to have any desired angular position on the wall includes a wall piece having a wall mounting plate attached to the wall, a threaded shank extending integrally outwardly from that plate on a shank axis, a rail piece mounting head integral with the threaded shank at the outer end of the shank, the mounting head extending radially from the shank axis to position beyond the periphery of the shank, and a rail piece clamping nut threadably mounted on the shank between the plate and the head.

The hardware also includes a rail piece having a rail mounting plate attached to the rail to be mounted, a rail piece mounting head receiving plate integral with and offset outwardly from a central portion of the rail mounting plate. The rail mounting plate and the rail piece mounting head receiving plate together define a mounting head receiving cavity open to a lower edge of the rail piece. The mounting head receiving plate is provided with a shank receiving slot open to the lower edge of the rail piece and extending centrally of the mounting head receiving cavity to terminate at an intermediate portion of that cavity. The construction of the rail piece is such that the cavity is of configuration to receive and encompass the mounting head as the shank is being installed in the shank receiving slot.

At least two sets of such hardware will be used to install the rail. For ease in installation, the outer surface of each mounting head will be inscribed with a plurality of radial lines each radiating outwardly from the shank axis. After two wall pieces are installed in relative position to establish the height and angle of the rail, the vertical side surface of the rail which is to receive the rail piece is held upwardly under the edges of the mounting heads, and identically placed scribe lines on the periphery of each mounting head are used to determine the location of pencilled scribe lines or other scratches at what will be the bottom of this vertical mounting side of the rail. These pencilled scribe markings will be extended on the rail at right angles to what will be the bottom surface of the rail, and a vertical scribe line on the center of the wall piece will be aligned with the scribe line on the rail. When so aligned, each of the rail pieces will be attached to the rail.

The rail with the rail pieces attached will be placed in its final upright relationship with respect to the wall, and the rail piece mounting heads will be put into the wall piece cavities between the backed off clamping nuts and the rail piece mounting head receiving plate. The clamping nut will then be advanced finally with the use of a wrench to firmly clamp the rail piece mounting head between the nut and the cavity side of the mounting head receiving plate.

DETAILED DESCRIPTION OF THE PREFERRED EMBODIMENTS

Figure 1:
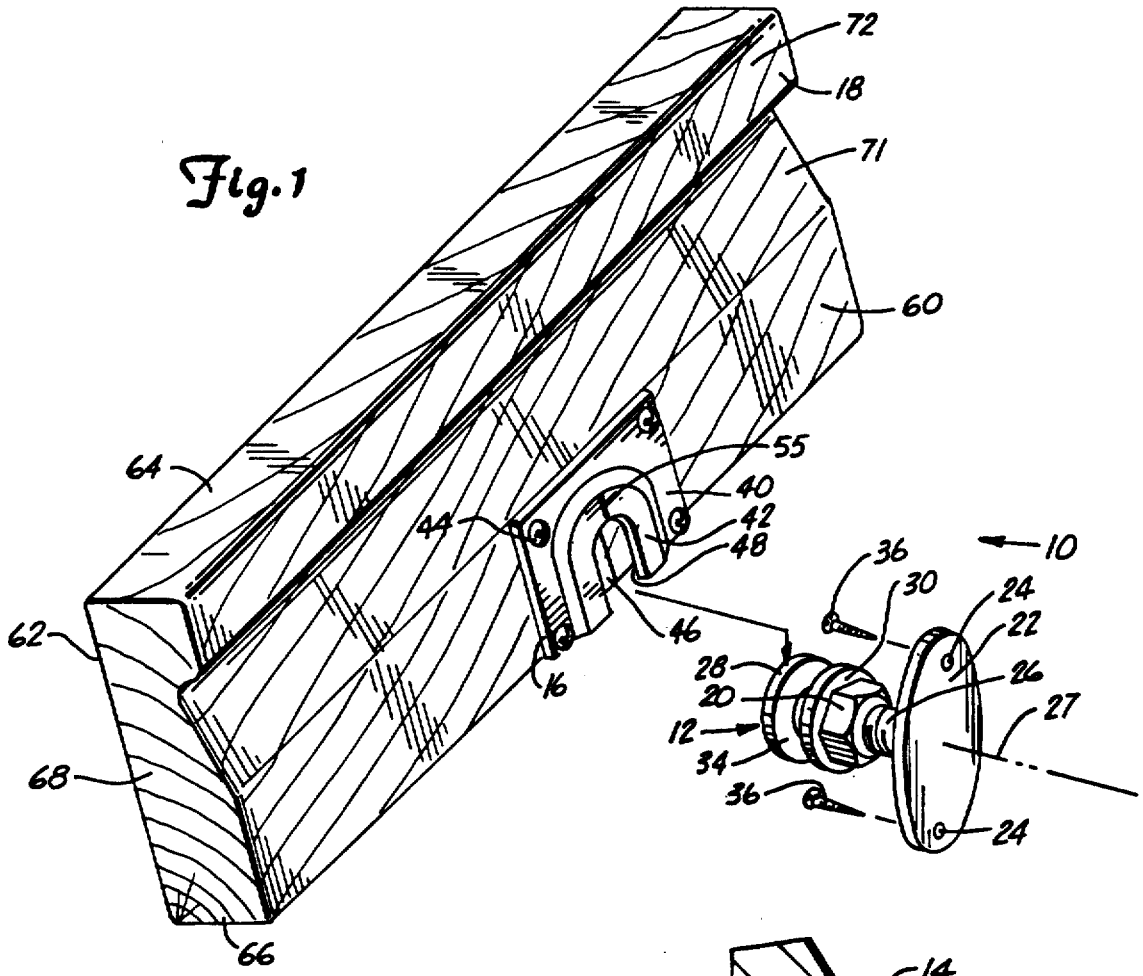
FIG. 1 is an exploded perspective view of hardware for mounting a handrail to a wall with a rail piece of that hardware shown attached to a portion of a rail to be mounted.

Hardware 10 for mounting a handrail to a wall includes a wall piece 12 for attachment to a wall 14, a rail piece 16 for attachment to a hand rail 18, and a clamping nut 20 for clamping the wall piece in fixed relation to the rail piece.

Wall piece 12 includes a wall mounting plate 22 having screw openings 24,24 therethrough, a threaded shank 26 extending integrally outwardly from the wall mounting plate 22 on a shank axis 27, and a rail piece mounting head 28. This mounting head 28 is integral with the shank 26, is of circular disk-like configuration, and is concentric with the axis 27. The clamping nut 20 is permanently threadably mounted on the threaded shank 26 between the wall mounting plate 22 and the rail piece mounting head 28. Clamping nut 20, in the form of the invention as shown, includes an integral flange 30 which is partially defined by a clamping surface 31 in normal relationship to the shank axis 27 in adjacent facing relationship to the mounting head 28. Mounting head 28 is partially defined by a clamping surface 34 in parallel facing relationship to the clamping surface 31.

A means provided to fixedly attach the wall piece 12 to the wall 14 includes the screw openings 24,24 in the wall mounting plate 22 and screws 36,36.

The rail piece 16 includes a rail mounting plate 40, and a rail piece mounting head receiving plate 42 offset from and integral with the rail mounting plate. Means for attaching the rail piece 16 to the handrail 18 includes appropriate screw receiving openings (not specifically shown) in the rail mounting plate 40, and screws 44.

Figure 2:
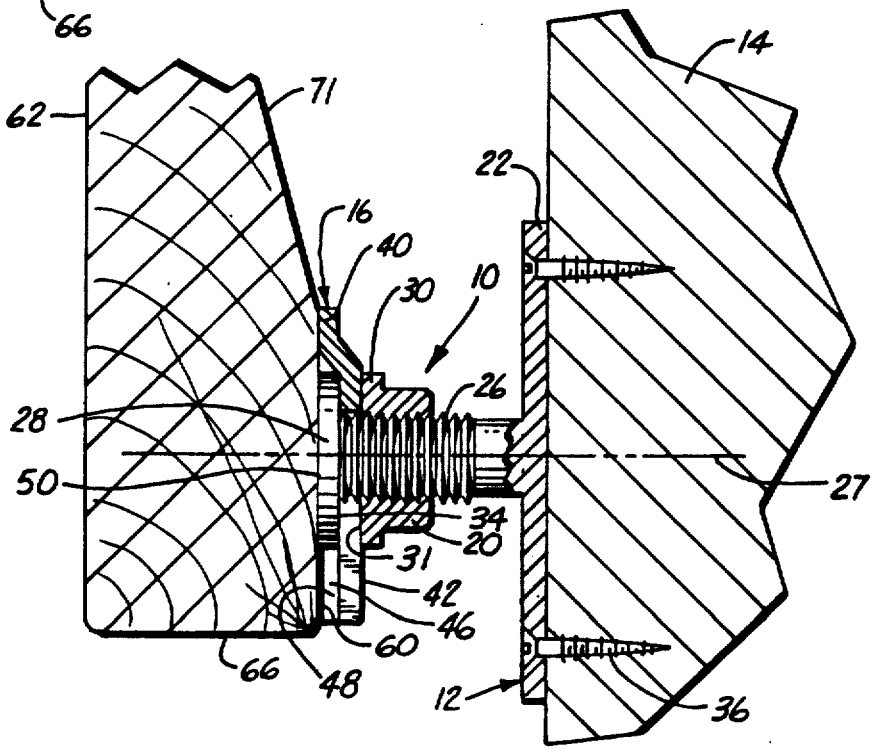
FIG. 2 is an enlarged vertical sectional view of the hardware of FIG. 1 shown in its installed position with respect to a wall and the handrail.
Figures 3, 4, 5:
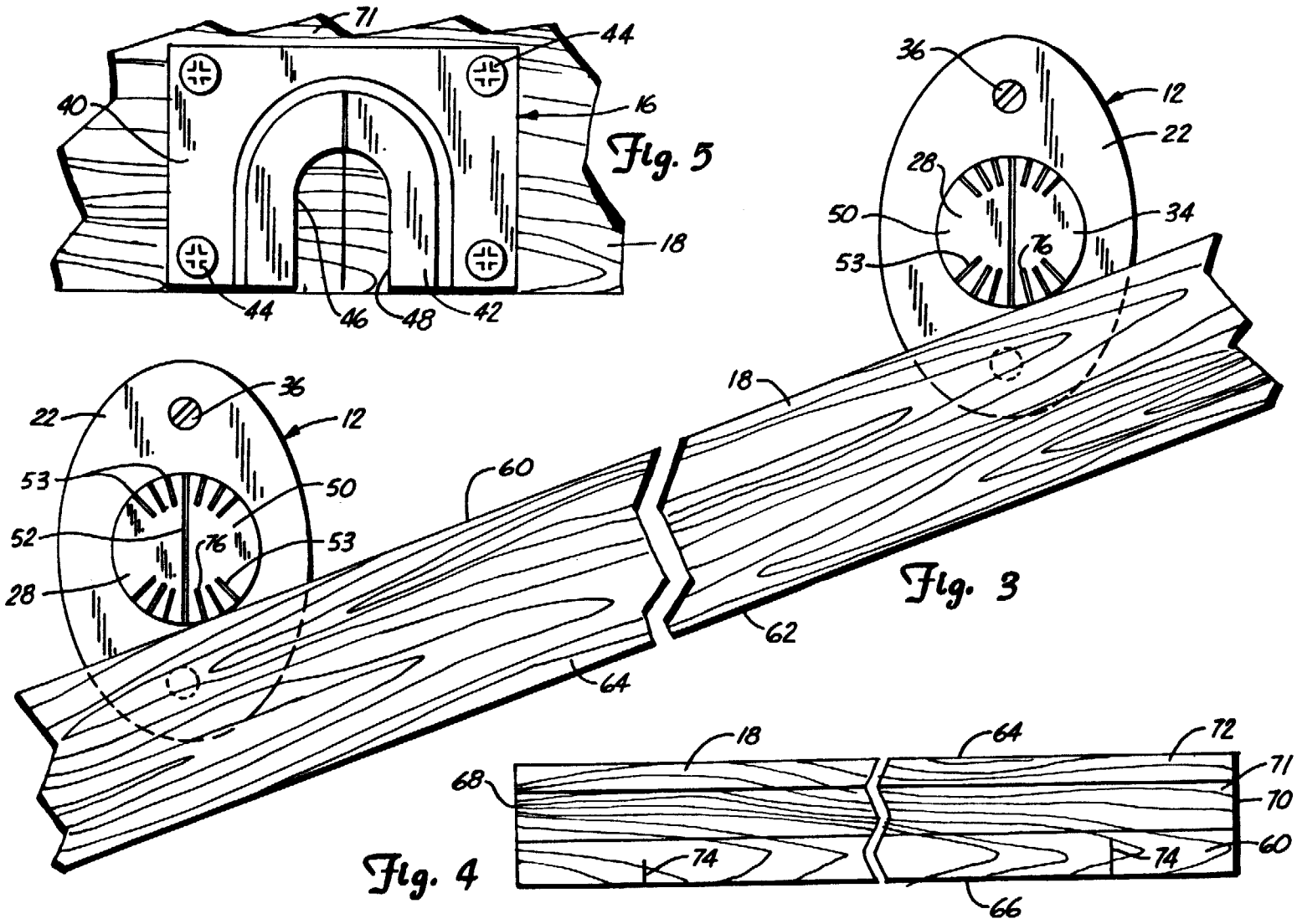
FIG. 3 is an elevational view of two wall pieces of the present invention positioned as if they were installed on a wall, together with a fragmentary top edge view of a handrail in position to be marked for proper mounting of the rail piece of FIGS. 1 and 2 thereon.
FIG. 4 is a fragmentary view of the handrail after having been marked for the installation of the rail pieces of FIG. 3.
FIG. 5 is an elevational view of the rail piece of FIG. 1 fixedly attached to a fragment of the handrail.

When attached to the rail 18 as seen in FIGS. 1, 2 and 5, rail mounting plate 40 and integral, offset mounting head receiving plate 42 define a mounting head receiving cavity 46. The receiving plate 42 is provided with a wall piece shank receiving slot 48. This slot is of configuration to receive the shank 26 when the mounting head 28 is in the cavity 46 and the shank is at the terminal closed end of the slot 48.

In addition to the clamping surface 34, the mounting head 28 is provided with an outer surface 50 in opposed, parallel relation to the clamping surface 34. This outer surface 50 is provided with a "vertical" scribe line 52 lying on an imaginary plane passing through the centers of the screw openings 24,24 in the wall mounting plate 22. Surface 50 is also provided with shorter radial, scribe lines 53, all of the scribe lines 52 and 53 radiating from the shank axis 27.

A "vertical" scribe line 55 is provided on the outer surface of the mounting head receiving plate 42 between the terminal end of the slot 48 and a point where the head receiving plate is integrally joined to the rail mounting plate 40.

METHOD OF INSTALLATION

To properly install a handrail such as the handrail 18 on a wall such as the wall 14, it is essential that the brackets or other hardware used be tied into a solid support area of the wall. For example, in the walls of having wallboard mounted to vertical studs (not shown), it is essential that the screws holding the hardware to the wall extend into such vertical studs. Normally, but not always, these studs are spaced apart by standard incremental distances. For example, studs are often on 16" or 24" centers. Also, where safety handrails are being installed along stairwells, the exact angle of the stairway (not shown) and, therefore, of the handrail 18 will not be precisely known until the time comes of actually install the handrail on the wall in parallel relationship to the general plane of the stairway. Safety railings are often installed along sloping ramps which, while not horizontal, are at much flatter angles than safety handrails on stairways.

For these reasons, it is very important that the wall pieces 12 of the present invention can be attached so as to receive the maximum support from the mounting screws in, for example, vertical studs (not shown) in the wall 14; and that the rail pieces 16 be situated precisely the same distance apart on the handrail 18 as the wall pieces 12 are situated from each other on the wall 14.

In order to clearly describe the method of installation of the rail 18 on the wall 14, the vertical rail face to be installed next to the wall has been designated as vertical mounting side surface 60. An oppositely disposed vertical outer side surface 62 of the rail is in parallel relationship to the mounting side surface 60. The rail is further defined by a top edge 64, a bottom edge 66, a first end surface 68, and a second end surface 70. The vertical mounting side surface 60 has been cut away as at 71 to form a hand grip 72.

The first step in the method of installing the handrail is to run a straight line on the wall where the railing is to be mounted, and then to locate places on that line along that wall where wall pieces 12 can be mounted so that the screws 36, extending through the screw openings 24 of the wall mounting plates 22, will extend firmly into studs or masonry or other sturdy portions of the wall. These wall mounting plates 22 can then be attached to the wall so that scribe lines 52 lie in vertical planes. This positioning of two such wall pieces 12 is illustrated in FIG. 3 of the drawings even though actual representation of the wall 14 has been omitted from the figure for economy of illustration.

Next the rail 18 is positioned with its "vertical" mounting side surface 60 uppermost in the same longitudinal position that it is to have with respect to the wall pieces 12 when it is installed. With this mounting side surface 60 immediately adjacent the outer surface 50 of the rail piece mounting heads as seen in FIG. 3, pencil lines or other scribe lines 74 will be made on side surface 60 from the bottom edge 66 of the rail and at right angles with respect to edge 66 toward the top edge 64. Each scribe line 74 will be made in alignment with the radial scribe line 52 or 53 which is most nearly in perpendicular relationship to the side surface 60. As seen in FIG. 3, this will be in alignment with shorter radial scribe lines indicated at 76,76.

Scribe lines 74,74 are illustrated in FIG. 4, where the handrail 18 has been rotated end for end and then rotated on its longitudinal axis so that its mounting side surface 40 and the scribe lines 74,74 can be seen in the figure.

Next, the rail mounting plate 40 of the rail piece 16 will be aligned with the bottom edge 66 of the rail, and also aligned so that each pencilled scribe line 74 on side surface 60 will lie in the same plane as the "vertical" scribe line 55 on the mounting head receiving plate 42. Each rail piece 16, when so aligned, will then be fixedly attached to the rail 18 as seen in FIG. 5 through the instrumentality of screws 44.

With the clamping nuts 20 on each threaded shank 26 "backed off" toward its wall mounting plate 22, the handrail 18 will be situated with each of the cavities 46 and slots 48 aligned vertically above one of the shanks 26 and mounting heads 28, and then lowered down so that the mounting head receiving cavities 46 receive the mounting heads 28 and the slots 48 receive the shanks 26. Clamping nuts 20 are then advanced toward the mounting heads, and with the use of an appropriate wrench, each set of the hardware of the invention takes position as seen in FIG. 2, and the handrail 18 is thus firmly installed with respect to the wall 14.

Throughout the specification, one of the hardware pieces has been referred to as the rail piece and another of the pieces has been referred to as the wall piece. It is to be understood, however, that the so-called wall piece could be installed on the rail and the rail piece could be installed on the wall. The only difference would be that the "rail piece" with the slot would be installed on the wall upside down so that the "wall piece" with the stem and the mounting head extending outwardly from vertical mounting side surface 60 of the rail 18 could be lowered down into the mounting head receiving cavity.

Although the present invention has been described with reference to preferred embodiments, workers skilled in the art will recognize that changes may be made in form and detail without departing from the spirit and scope of the invention.

What is claimed is:

1. A method of mounting a rail to a wall, comprising the step of providing at least two sets of hardware, each set including:

(a) a wall piece including a wall mounting plate, a threaded shank extending integrally outwardly from the plate on a shank axis, a rail piece mounting head integral with the threaded shank at an outer end of the shank and extending radially from said axis to position beyond the periphery of the shank, and a rail piece clamping nut threadably mounted on the shank between the plate and head, wherein the mounting head is partially defined by a circular outer surface having a plurality of scribe lines inscribed thereon extending radially outwardly from the shank axis, (b) means to fixedly attach the wall mounting plate to a wall, (c) a rail piece including a rail mounting plate, and a rail piece mounting head receiving plate integral with and offset outwardly from a central portion of the rail mounting plate to define with the rail mounting plate a mounting head receiving cavity open to a lower edge of the rail piece, said mounting head receiving plate being provided with a shank receiving slot open to the lower edge of the rail piece, extending centrally of the mounting head receiving cavity and terminating at an intermediate portion of the cavity, the slot having an axis extending longitudinally thereof, the construction of the rail piece being such that said cavity is of configuration to receive and encompass the mounting head as the shank is being installed in the shank receiving slot, and wherein an outer face of the mounting head receiving plate is inscribed with a scribe line in alignment with the axis of the shank receiving slot, and (d) means to fixedly attach the rail mounting plate to a rail to be mounted;

the method further including the steps of:

first, attaching the wall mounting plates to the wall in position to determine the final position and angle of the rail;

second, holding a surface of the rail which will eventually face the wall in an upwardly facing position below the mounting heads of the wall pieces, and bringing said rail surface into adjacent relation to the underside of each mounting head;

third, using the mounting head scribe lines most nearly perpendicular to the said rail surface as guides, marking on said rail surface rail guide lines at right angles to the longitudinal axis of the rail;

fourth, positioning each rail piece on the rail to have its receiving plate scribe line lie in a plane which is perpendicular to the longitudinal axis of the rail and which includes one of the rail guide lines, and attaching each rail mounting plates to the rail while so positioned;

fifth, with each clamping nut backed off, setting the rail down on the wall pieces, thereby causing each rail piece mounting head receiving plate to encompass one of the shanks and one of the mounting heads and sixth, tightening each clamping nut, thereby clamping each rail piece mounting head receiving plate between one of the nuts and one of the mounting heads.

*2. A method of mounting a rail to a wall, comprising the steps of providing at least two sets of hardware, each set including:*

*(a) a wall piece including a wall mounting plate, a threaded shank extending integrally outwardly from the plate on a shank axis, a rail piece mounting head integral with the threaded shank at an outer end of the shank and extending radially from said axis to position beyond the periphery of the shank, and a rail piece clamping nut threadably mounted on the shank between the plate and head, wherein the mounting head is partially defined by a circular, relatively flat, outer surface,*

*(b) means to fixedly attach the wall mounting plate to a wall,*

*(c) a rail piece including a rail mounting plate, and a rail piece mounting head receiving plate integral with and offset outwardly from a central portion of the rail mounting plate to define with the rail mounting plate a mounting head receiving cavity open to a lower edge of the rail piece, said mounting head receiving plate being provided with a shank receiving slot open to the lower edge of the rail piece, extending centrally of the mounting head receiving cavity and terminating at an intermediate portion of the cavity, the slot having an axis extending longitudinally thereof, the construction of the rail piece being such that said cavity is of configuration to receive and encompass the mounting head as the shank is being installed in the shank receiving slot, and wherein the mounting head receiving plate is provided with a relatively flat outer face, and*

*(d) means to fixedly attach the rail mounting plate to a rail to be mounted;*

*the method further including the steps of:*

*first, attaching the wall mounting plates to the wall in position to determine the final position and angle of the rail;*

*second, holding a surface of the rail which will eventually face the wall in an upwardly facing position below the mounting heads of the wall pieces and bringing said rail surface into adjacent relation to the underside of each mounting head;*

*third, marking a rail guide line on said rail surface in immediately adjacent relation to the underside of each mounting head so that these guide lines are each at right angles to the longitudinal axis of the rail and intersect with a radial line extending from the center of the mounting head, which lies in perpendicular relation to the longitudinal axis of the rail;*

*fourth, positioning each rail piece on the rail to have the center of the outer face of the mounting head receiving plate defining the terminal closed end of the wall piece shank receiving slot lie in a plane which is perpendicular to the longitudinal axis of the rail and which includes one of the rail guide lines, and attaching each of the rail mounting plates to the rail while so positioned;*

*fifth, with the clamping nut backed off, setting the rail down on the wall pieces to cause the rail receiving plate to encompass the shank and the mounting head; and*

*sixth, tightening each clamping nut, thereby clamping each rail piece mounting head receiving plate between one of the nuts and one of the mounting heads.*

* * * * *